May 22, 1951 F. POSTMA 2,554,154
BEARING LUBRICATION
Filed Oct. 26, 1946 2 Sheets-Sheet 1

INVENTOR,
Frank Postma,
BY John W. Steward.
ATTORNEY

May 22, 1951  F. POSTMA  2,554,154
BEARING LUBRICATION
Filed Oct. 26, 1946  2 Sheets-Sheet 2

INVENTOR,
Frank Postma,
BY John W. Seward,
ATTORNEY

Patented May 22, 1951

2,554,154

UNITED STATES PATENT OFFICE 2,554,154

BEARING LUBRICATION

Frank Postma, Paterson, N. J.

Application October 26, 1946, Serial No. 705,983

8 Claims. (Cl. 184—6)

This invention relates to bearings of the type including a member having a bore (which I shall term a receiving member), a member having a journal contained in the bore (which I shall term a journal member) and a sleeve-like annular element which lines the bore (which I shall term the lining member) and with which the journal member is in wiping contact. Frequently, for the purpose of assembly, the receiving member and the lining member are formed in sections, the receiving member having its sections clamped together and thereby clamping the lining member so as to form a unit therewith. An assembly comprising these parts exists, for instance, in any internal-combustion engine—for example, where a portion (being the receiving member) of the fixed structure of the engine is bored and lined (by the lining member) for the reception of a portion (being the journal member) of the engine main shaft, or where a piston coupling link (providing the receiving member) is bored and lined (by the lining member) for reception of an eccentric or eccentric stub-shaft (being the journal member) of a crank on the main or crank shaft.

In any event, my invention is particularly concerned with a lining member which is interiorly channeled and has an oil intake port extending from its exterior to the channel. This port and the channel form communicating parts of an oil-conducting means which also includes an oil-induction passage in some part of the engine (as its fixed structure, for instance) and discharging to said port, and frequently there is an outlet passage in another part of the engine discharging from the channel to some other point where lubrication is also required.

Certain faults characterize the conventional lining member, channeled and having the intake port. By a suitable pumping means the oil is usually and desirably supplied in not more than the quantity needed for lubrication at the contemplated point or points. But even in the initial or unused state of the parts the oil, its supply thus calculated, frequently escapes to the exterior from between the lining and journal members so that it not only fails to lubricate them sufficiently but it is thrown to or otherwise reaches parts of the engine where its presence is harmful, as in the cylinder, causing carbonizing and spark-plug failure.

When these faults reach the serious stage it is necessary to remove the lining member and apply a new lining member (sometimes called a "replacement bearing"), which treatment has its limitations, thus: Assume, for instance, that the new lining member is to be associated with a journal member forming a part of the main or crank-shaft of a conventional internal-combustion engine. Due to the action of the pistons such journal member has possibly become worn "out-of-round," which of course means escape of oil to the exterior even after an internally truly cylindrical fresh lining member has been substituted; and although the substituted lining member is channeled the same as the original and therefore would fit any ridge which the latter may have by wear formed on the journal member due to presence of its own channel, leakage of oil to the exterior nevertheless ensues because of the "out-of-round" condition.

My invention contemplates reducing the circumferential extent of the channel so that the latter will be ineffective to contain oil in such excessive quantity that the intended parts do not obtain proper lubrication and other faults ensue.

According to my invention I provide a bearing in which, fixed in the lining member, is means which dams off from the remainder of the channel a part of the circumferential extent of the latter and to which part the said port discharges, said means being disposed to be wiped by the perimeter of the journal member. Such means desirably takes the form of material which is deformable by the journal member, as by being either less resistant to wear or less resistant to compression than the metal of the journal member, or of material having both these qualities; and such material may be metal or characterized by a fibrous component. Having either of these qualities said means as initially incorporated in the lining member may somewhat protrude beyond the inner surface of the latter, thus to have its protruding surface ultimately develop flush with said inner surface of the lining member either by wear effected by the journal member or by the compression to which the unit comprising the lining member and said means is subjected by the journal and receiving members. The invention may obviously be applied to a new or unused bearing or to a bearing which has undergone wear in use so that it has to be relined.

Figure 1:
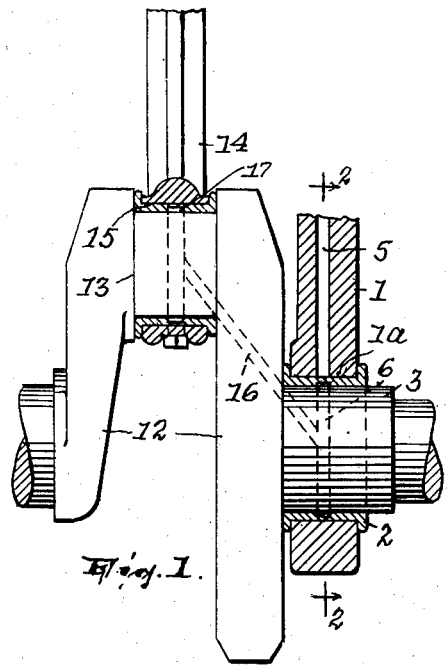
Fig. 1 shows one typical assembly of parts to which my invention may be applied, to wit, of an internal-combustion engine, the view being partly in elevation and partly in section in the plane through the journal member shown.
Figures 2, 3:
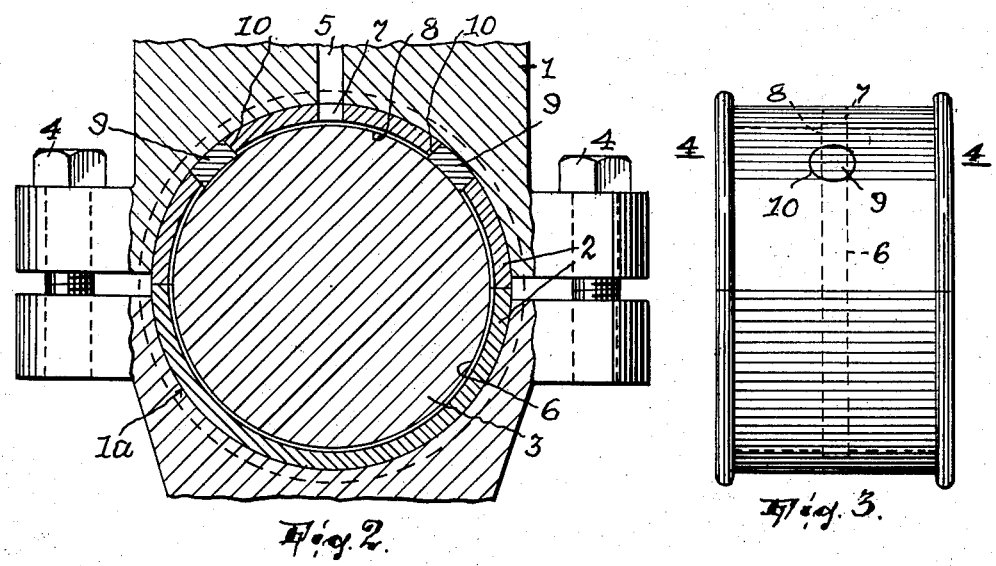
Fig. 2 shows such assembly, on a larger scale, in section on line 2—2, Fig. 1.
Fig. 3 is a side elevation of the unit comprising the lining member and said means of Fig. 2.

In the assembly shown in Figs. 1 to 3, let 1 be the receiving member (as a part of the engine fixed structure), 2 the lining member, and 3 the journal member. The latter is here assumed to be one of a plurality alined with each other and going to form what is commonly termed the crank-shaft of a conventional internal-combustion engine in which the journal members are journaled in lining members like the one designated 2 and contained in the bores, as 1a, of receiving members such as 1. The receiving member is usually formed in two sections, as shown, clamped together, as by screws 4, and clamping together and in fixed relation to the receiving member the two sections of the lining member. Other parts of the engine appearing in Fig. 1 will be hereinafter referred to.

The receiving member has an oil-induction passage 5 extending to its bore 1a. The lining member has an interior channel 6 extending circumferentially and here, as usual, clear around the axis of said member, and it has an intake port 7 connecting said passage and channel. Oil delivered to the channel via said passage and port seeps from the channel laterally to lubricate the opposed surfaces of the lining and journal members both sides of the channel.

Figure 4:
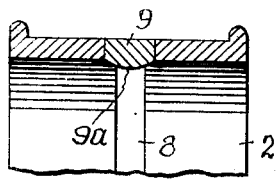
Fig. 4 is a fragmentary section on line 4—4 of Fig. 3.
Figure 4A:
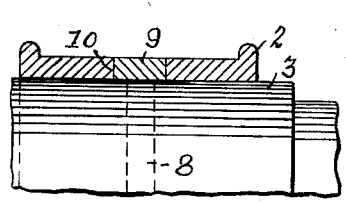
Fig. 4a shows the unit comprising the lining member and said means the same as in Fig. 4, but with said means deformed, and a fragment of the journal member in elevation.
Figure 4B:
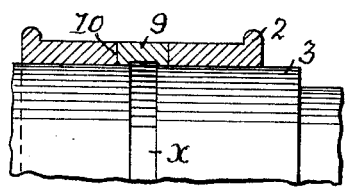
Fig. 4b is a view like Fig. 4a, but showing a modified form of the journal member and showing said means as deformed thereby.

More or less of that portion of the circumferential extent of the channel 6 to which the intake port 7 directly discharges is to be dammed off from the remainder thereof thus to provide the lining member with an oil-receiving space 8 of less capacity than the otherwise unrestricted channel. For this purpose there is in said lining member the means shown at 9 in Figs. 4a or 4b, here comprising separate masses disposed at opposite sides of and both spaced from the intake port. In this example they exist fixed to the lining member by occupying holes 10 penetrating it and each of which traverses the channel. Each may initially exist protruding (Fig. 4) more or less inwardly beyond the inner surface of the lining member, as shown at 9a in Fig. 4, with the purpose of thereupon causing the journal member to deform it to its ultimate or normally operative form i. e., either by compressing action of the lining member resulting from subjecting its sections to the clamping pressure of the sertions of the reeciving member or by deforming wear of such masses by the journal member incident to relative rotation of such member and the unit formed by the receiving and lining members. To be thus deformable said masses may be of any substance, as a suitable metal, of less resistance to wear, or less resistance to pressure, or both, than the lining member; or they may be composed of some fibrous body compounded with a viscous substance. Fig. 4a shows one of such masses deformed by the journal member so that its interior surface is wholly flush with the interior surface of the lining member; Fig. 4b shows one of such masses deformed to the longitudinal section of a journal member which has been worn by a channeled lining member so that a circumferential ridge x has developed thereon.

Figure 5:
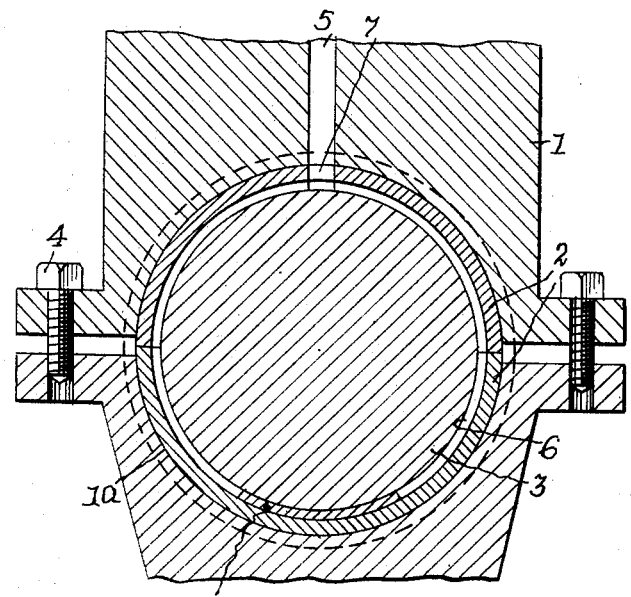
Fig. 5 is a view like Fig. 2 but showing a construction of said unit at least within the scope of my invention.
Figure 6:
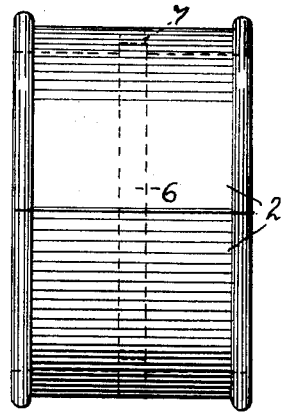
Fig. 6 is a side elevation of said unit shown in Fig. 5.

As indicated, the location of the said means circumferentially of the channel is to be determined according to that capacity of the resulting oil-receiving space 8 which is found necessary in order effectively to lubricate where intended and avoid the faults incident to excessive oil delivery. Whether or not such means takes the form of a plurality of the said masses is not material, as shown by Fig. 5 in which at 11 is shown a single mass in the channel.

In Fig. 1, one of the cranks of the crank-shaft is shown at 12, with a journal member at 13, a receiving member at 14 (as a link to connect the crank with a piston of the engine) and a lining member at 15. The lining member 15 is provided with the oil-receiving channel 17 extending therearound on the face confronting the journal member 13. Such channel 17 connects with passage 16 through the right hand crank arm 12, as shown in Fig. 1, passage 16 in turn connecting with the oil-receiving channel 6 in lining member 2. The purpose of illustrating the parts 12 to 17 is to present the circumstance that the oil delivered to the bearing member including lining member 2 is frequently delivered from the latter bearing to the one including a lining member, as 15, by the outlet passage 16 extending through the parts 3, 12 and 13, with the consequence that in the rotation of the crank-shaft centrifugal force is a factor in unduly dissipating the oil.

By damming off from the remainder of the channel a part thereof to which the intake port directly discharges I overcome a well-recognized cause of serious faulty lubrication to which, in conclusion, I refer. That is to say, centrifugal force active on the oil in the channel becomes a quite material factor in resisting the effort of the oil-pumping means to serve oil to the channel via a passage, as 5, when the engine is operated at high speed: the higher the speed the less the amount of oil fed to the point or points intended to be lubricated and the greater the amount of oil discharged from the bearing uselessly. By reducing the effective oil-receiving space of the channel the weight or mass of the oil in the channel and hence its centrifugal force is correspondingly reduced.

Having thus fully described my invention what I claim is:

1. An annular bearing lining member adapted to be mounted within the bore of an annular receiving member and to journal a rotary member therewithin, the receiving member having an oil-induction passage leading to its bore, the bearing lining member having an interior channel formed around the axis of said lining member and an intake port connecting with the channel and adapted to connect with the passage in the receiving member, means sealing off from the remainder of the channel a part of the circumferential extent of the channel and to which part said port discharges, said means being fixed in the lining member and so disposed as to be adapted to be wiped by the perimeter of the rotary member, said sealing means being a dam member applied to the lining member in fixed position relative thereto, said dam member filling the channel in one zone thereof, said dam consisting of material less resistant to wear and compression than the rotary member and the lining member.

2. An annular bearing lining member adapted to be mounted within the bore of an annular receiving member and to journal a rotary member therewithin, the receiving member having an oil-induction passage leading to its bore, the bearing lining member having an interior channel formed around the axis of said lining member and an intake port connecting with the channel and adapted to connect with the passage in the receiving member, means sealing off from the remainder of the channel, when the rotary member is mounted in the bearing, a part of the circumferential extent of the channel and to which part said port discharges, said sealing means comprising a sealing dam, said dam being located in and filling the circumferential channel at a zone on one side of the port and extending a substantial distance on each side of said channel at said zone, the sealing dam being attached to the lining member in fixed position thereto and being so disposed as to be wiped by the perimeter of the rotary member, said dam consisting of material less resistant to wear and compression than the rotary member and the lining member.

3. An annular bearing lining member adapted to be mounted within the bore of an annular receiving member and to journal a rotary member therewithin, the receiving member having an oil-induction passage leading to its bore, the bearing lining member having an interior channel formed around the axis of said lining member and an intake port connecting with the channel and adapted to connect with the passage in the receiving member, means sealing off from the remainder of the channel, when the rotary member is mounted in the bearing, a part of the circumferential extent of the channel and to which part said port discharges, said sealing means comprising two sealing dams, one dam being located in and filling the circumferential channel at a zone on one side of the port and the other dam being located in and filling the channel at a zone on the other side of the port, and extending a substantial distance on each side of said channel at the respective zones thereof, the sealing dams being attached to the lining member in fixed position relative thereto and being so disposed as be wiped by the perimeter of the rotary member, said dams consisting of material less resistant to wear and compression than the rotary member and the lining member.

4. The combination with a journal member of an annular receiving member containing in its bore the journal member and having an oil-induction passage leading to said bore, and an annular lining member fixed in the bore and having an interior channel formed around the axis of said lining member and an intake port connecting said passage and channel, means sealing off from the remainder of the channel a part of the circumferential extent of the channel and to which part said port discharges, said sealing means comprising two sealing dams, the dams being spaced from each other circumferentially of the bearing, one dam being located in and filling the circumferential channel at a zone on one side of the port and the other dam being located in and filling the channel at a zone on the other side of the port, and extending a substantial distance on each side of said channel at the respective zones thereof, the sealing dams being attached to the lining member in fixed position relative thereto and being so disposed as to be wiped by the perimeter of the rotary member, said dams consisting of material less resistant to wear and compression than the rotary member and the lining member.

5. The combination of a worn crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, the main journal being worn so that it has a circumferential ridge thereon intermediate its ends, a main journal bearing, means to support the main journal bearing, and means to feed lubricant under pressure between the main journal and the main journal bearing, the main journal bearing having an oil induction passage leading to its bore, said passage constituting a portion of the last named means, said main journal bearing having an interior channel formed around its axis connected to the oil induction passage, and confronting the circumferential ridge on the main journal, the inner end of the passageway in the main journal which feeds lubricant to the crank journal confronting the channel, and means sealing off from the remainder of the channel a part of the circumferential extent of the channel and to which part said oil induction passage discharges, said sealing means comprising two sealing dams, the dams being spaced from each other circumferentially of the bearing, one dam being located in and filling the circumferential channel at a zone on one side of the port and the other being located in and filling the channel at a zone on the other side of the port, the sealing dams being attached to the lining member in fixed position relative thereto and filling the channel in their respective zones, spanning the ridge and effecting a seal therewith and with the portions of the main journal on both sides of the ridge, whereby the amount of lubricant present between the main journal and the main journal bearing is limited and the feeding of lubricant to the crank journal is periodically discontinued as the crankshaft rotates.

6. The combination of a worn crankshaft having at least one main journal and at least one crank arm and journal, a bearing on the crank arm journal, means to feed lubricant under pressure through the main journal, the crank arm, and the crank arm journal from the main journal to a position between the crank arm journal and bearing comprising a passageway through such members, the main journal being worn so that it has a circumferential ridge thereon intermediate its ends, a main journal bearing, means to support the main journal bearing, and means to feed lubricant under pressure between the main journal and the main journal bearing, the main journal bearing having an oil induction passage leading to its bore, said passage constituting a portion of the last named means, said main journal bearing having an interior channel formed around its axis connected to the oil induction passage, and confronting the circumferential ridge on the main journal, the inner end of the passageway in the main journal which feeds lubricant to the crank journal confronting the channel, and means sealing off from the remainder of the channel a part of the circumferential extent of the channel and to which part said oil induction passage discharges, said sealing means comprising two sealing dams, the dams being spaced from each other circumferentially of the bearing, one dam being located in and filling the circumferential channel at a zone on one side of the port and the other being located in and filling the channel at a zone on the other side of the port, the sealing dams being attached to the lining member in fixed position relative thereto and filling the channel in their respective zones, said dams consisting of material less resistant to wear and compression than the main crankshaft journal, spanning the ridge and effecting a seal therewith and with the portions of the main journal on both sides of the ridge, whereby the amount of lubricant present between the main journal and the main journal bearing is limited and the feeding of lubricant to the crank journal is periodically discontinued as the crankshaft rotates.

7. The combination of a worn journal member having a circumferential ridge thereon intermediate its ends, an annular receiving member containing in its bore the journal member and having an oil-induction passage leading to said bore, an annular bearing lining member fixed in the bore and having an interior channel formed around the axis of said lining member and an intake port connecting said passage and channel, means sealing off from the remainder of the channel a part of the circumferential extent of the channel and to which part said port discharges, said sealing means comprising at least one sealing dam, said sealing dam being fixed in the lining member and so disposed as to be wiped by the perimeter of the journal member at the circumferential ridge thereon, said sealing dam spanning the ridge and effecting a seal therewith and with the portions of the main journal on both sides of the ridge, whereby the amount of lubricant present between the journal and the journal bearing is limited.

8. The combination of a worn journal member having a circumferential ridge thereon intermediate its ends, an annular receiving member containing in its bore the journal member and having an oil-induction passage leading to said bore, and an annular lining member in the bore and having an interior channel formed around the axis of said lining member and an intake port connecting said passage and channel, means sealing off from the remainder of the channel a part of the circumferential extent of the channel and to which part said port discharges, said sealing means comprising two sealing dams, one being located in the circumferential channel on one side of the port and the other sealing dam being located in the channel on the other side of the port, the sealing dams being fixed in the lining member and being so disposed as to be wiped by the perimeter of the rotary member at the circumferential ridge thereon, said sealing dams each spanning the ridge and effecting a seal therewith and with the portions of the journal on both sides of the ridge, whereby the amount of lubricant present between the journal and the journal bearing is limited.

FRANK POSTMA.

REFERENCES CITED

The following references are of record in the file of this patent:

UNITED STATES PATENTS

| Number | Name | Date |
|---|---|---|
| 1,748,120 | Fisher | Feb. 25, 1930 |
| 2,004,254 | Taub | June 11, 1935 |
| 2,371,399 | Mantle | Mar. 13, 1945 |